Oct. 13, 1925. 1,557,214
J. L. McCLANE
AIRPLANE CONTROL MECHANISM
Filed Feb. 14, 1922 2 Sheets-Sheet 1
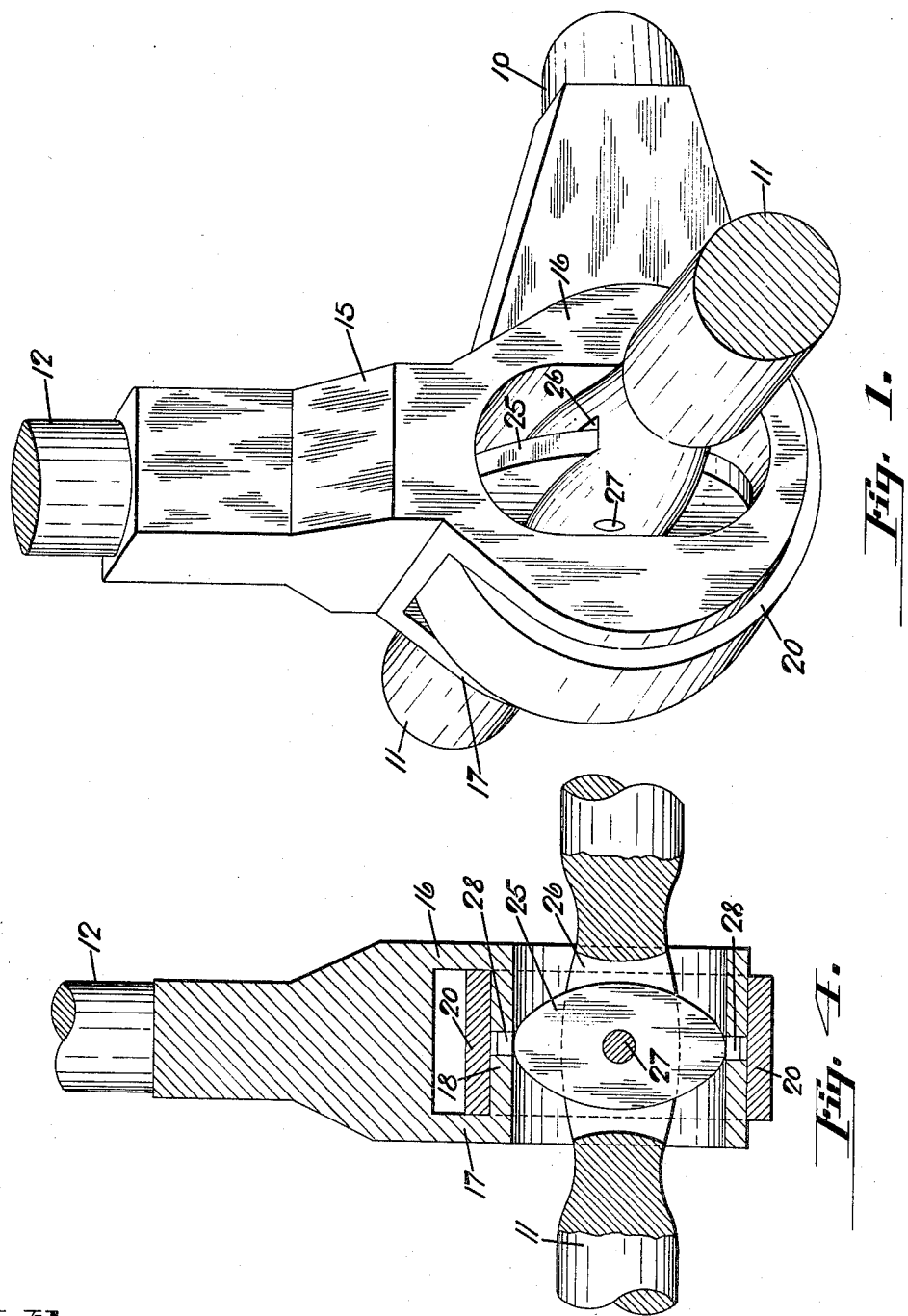
Witness.
Inventor.
Joseph L. McClane
By
Ralph H. Chilton
Attorney.

Oct. 13, 1925.
J. L. McCLANE
1,557,214
AIRPLANE CONTROL MECHANISM
Filed Feb. 14, 1922    2 Sheets-Sheet 2
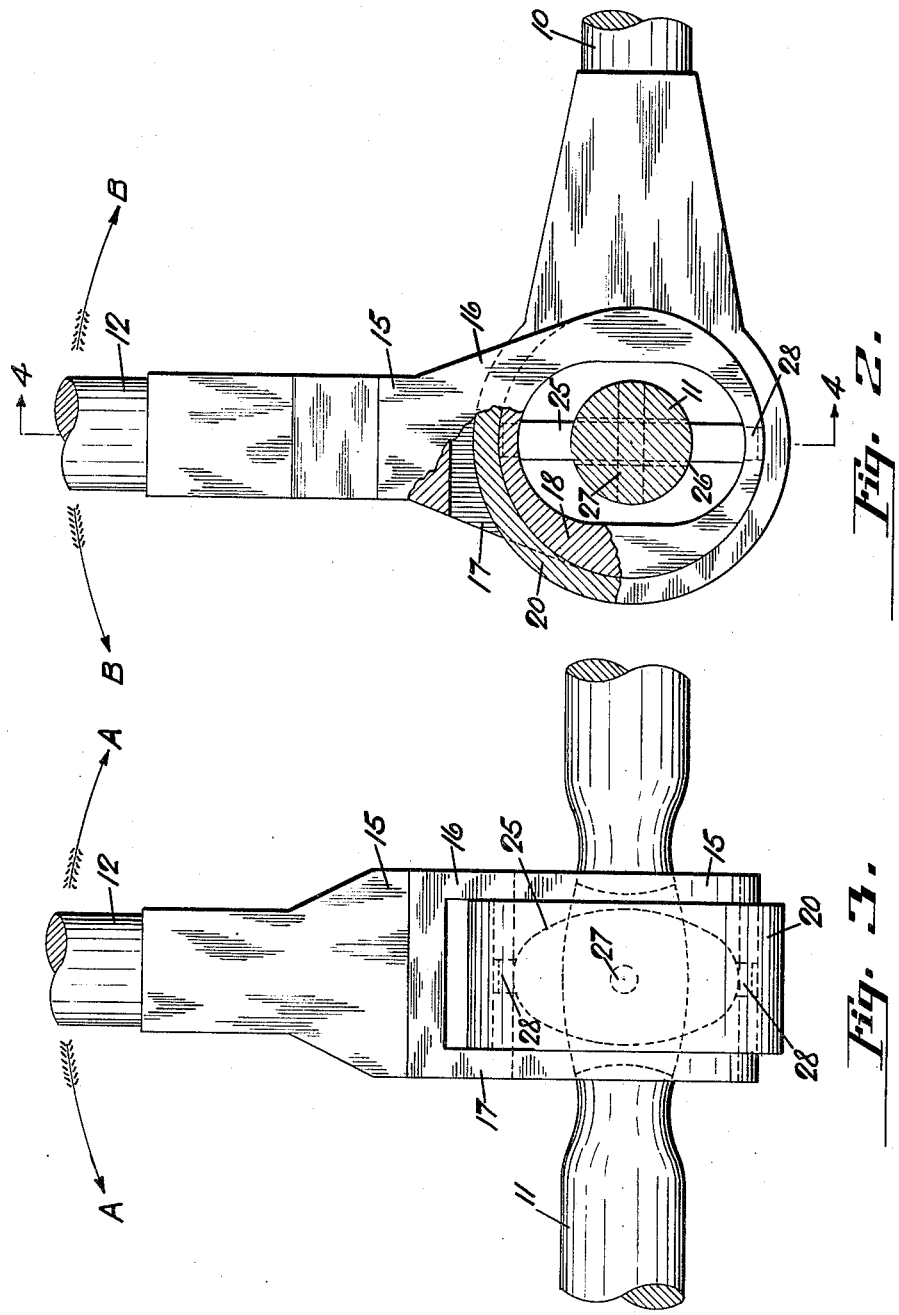
Witness.
Elmer E. Freed
Geo. E. Pasco.
By
Inventor.
Joseph L. McClane
Ralph H. Chilton
Attorney.

Patented Oct. 13, 1925.

1,557,214

UNITED STATES PATENT OFFICE.

JOSEPH L. McCLANE, OF DAYTON, OHIO, ASSIGNOR TO DAYTON-WRIGHT COMPANY, OF DAYTON, OHIO, A CORPORATION OF DELAWARE.

AIRPLANE-CONTROL MECHANISM.

Application filed February 14, 1922. Serial No. 536,539.

*To all whom it may concern:*

Be it known that I, JOSEPH L. McCLANE, a citizen of the United States of America, residing at Dayton, county of Montgomery, and State of Ohio, have invented certain new and useful Improvements in Airplane-Control Mechanism, of which the following is a full, clear, and exact description.

This invention relates to control mechanism and is especially adapted for use in airplane controls. An object of this invention is a control system embodying improved controlling and actuating devices therefor whereby the construction is simplified so as to occupy a minimum of space and the operation of the system as a whole is improved, and whereby the control devices are rendered more dependable and reliable than the devices of the prior art, the expense in manufacture, due to simplification and standardization, being reduced to a minimum.

More particularly the invention relates to an improved means for independently operating two torque shafts by means of a control handle which is connected to the two torque shafts at their point of intersection through a compact self contained universal joint.

Further objects and advantages of the present invention will be apparent from the following description, reference being had to the accompanying drawings, wherein preferred forms of embodiments of the present invention are clearly shown.

In the drawings:

Fig. 1 is a perspective view showing the general assembly of the two torque shafts and the control handle.

Fig. 2 is a side view showing the elevator torque shaft in section and parts broken out to show the interior structure.

Fig. 3 is a view at right angles to Fig. 2.

Fig. 4 is a section on line 4—4 of Fig. 2.

In the drawings similar reference characters refer to similar parts throughout the several views.

Numeral 10 designates the aileron actuating torque shaft which preferably extends longitudinally of the fuselage of an airplane; 11 designates the elevators actuating torque shaft which I have shown running at right angles to the aileron torque shaft and hence transversely of the airplane fuselage. However it is not necessary, as will be later herein described, that the aileron and elevator torque shafts meet each other at right angles. The control stick 12, which in its normal or neutral position is perpendicular to both of the torque shafts 10 and 11, has an operable connection to both shafts whereby either shaft may be actuated at any time entirely without movement of the other shaft. The particular means by which this is accomplished will now be described.

The control stick 12 is provided with a yoke 15 at its lower end and extending transversely across the yoke arms 16 and 17 is the control stick fulcrum pin 18. Rigidly attached to the aileron torque shaft 10 is the sleeve 20 which has a running fit upon the fulcrum pin 18. Therefore it is obvious that when the control stick 12 is rotated in the direction of arrows A A in Fig. 3 that the torque shaft 10 will be similarly rotated.

The fulcrum pin 18 and the yoke arms 16 and 17 are hollowed out as best shown in Fig. 2 to permit the passage therethrough and clearance space for the elevator torque shaft 11. Shaft 11 is provided with a slot 26 down its center line as shown and a member 25 is pivoted within this slot by pivot pin 27 which is at all times perpendicular to the axes of shaft 11 and control stick 12 at their point of intersection. Member 25 is also pivoted across the interior of the fulcrum pin 18 by the pivot pins 28 which center along the axis of the control stick 12, and hence are at all times perpendicular to pin 27. It is clear from this description and drawings that when the stick 12 is moved in the direction of arrows B B in Fig. 2 that the torque shaft 11 will be similarly rotated without moving the torque shaft 10. If the stick 12 is moved to the right as viewed in Fig. 2 to an angle of 45° it will also move the member 25 and pin 27 to make an angle of 45° with the horizontal. If from this position the stick 12 is moved laterally in order to rotate shaft 10, it is clear that the forward tilt of member 25 must not be changed if shaft 11 is to remain stationary. Therefore member 25 must rotate about pin 27 as an axis and since the stick 12 is permanently aligned with member 25 the stick 12 must also rotate about pin 27 as an axis. The torque shaft 10 is constrained to rotate only about its own axis and hence there will be a relative sliding between parts which are rigid with shaft 10 and parts which are rigid with the stick 12, that is, there will be a relative sliding between the yoke 15 and the sleeve 20. It is thus seen that when stick 12 is moved in a plane transverse the fuselage only torque shaft 10 will be rotated and when it is moved in a plane longitudinally of the fuselage only shaft 11 will be rotated.

The pivot pins 28 permit the above described operation even though shafts 10 and 11 are not perpendicular to each other, it being only necessary that the axis of shaft 10 intersect the axis of shaft 11. It will be clear from the drawings, especially Fig. 4, that the torque shaft 10 may be rotated a small angle about the axis of pins 28 as a pivot and yet not interfere with the above described operation of the operating handle 12. The advantage of this feature is that it will be unnecessary to align shaft 10 at right angles to shaft 11 to prevent binding of the movable parts of the joint when the handle 12 is operated.

I have herein shown only one embodiment of my invention, however others may be easily devised by those skilled in the art by utilizing the fundamental principle of having three pivots whose axes are at all times mutually perpendicular to one another. The three pivots in the embodiment shown herein are the hollow fulcrum pin 18, the pivot journals 28 which in effect constitute a single pivot pin, and the pivot pin 27, the axes of all three of which are mutually perpendicular.

If desired the torque shaft 10 may extend on both sides of the universal joint, as there is nothing in the operation thereof to prevent a continuation of shaft 10 being attached to the sleeve 20 on its opposite side. By thus continuing the aileron actuating torque shaft, a similar control means may be mounted thereupon at another point to give a dual control. The transverse elevator actuating torque shafts of the dual control may be interconnected in the ordinary manner.

While the forms of mechanisms herein shown and described, constitute preferred forms of embodiments of the present invention, it is to be understood that other forms might be adopted, all coming within the scope of the claims which follow.

What I claim is as follows:

1. In airplane control mechanism, a torque shaft, a second torque shaft intersecting said first torque shaft, an actuating handle for said torque shafts, and means for pivoting the handle to the torque shafts in such a way that either shaft may be actuated independently of the other, said pivoting means comprising a fork on the handle pivoted to the first torque shaft, and a cross member in said fork for pivoting to the second torque shaft.

2. A torque shaft, a second torque shaft intersecting said first torque shaft, an actuating handle for said torque shafts and means for pivoting the handle to the torque shafts in such a way that either shaft may be actuated independently of the other, said means including three pivots having mutually perpendicular axes.

3. A torque shaft, a second torque shaft intersecting said first torque shaft, an actuating handle for said torque shafts and means for pivoting the handle to the torque shafts in such a way that either shaft may be actuated independently of the other, said means including three pivots having mutually perpendicular axes, two of said pivots being perpendicular at all times to the axes of their respective torque shafts while the axis of the third pivot is coincident with the axis of the handle.

4. In combination, a torque shaft rotatably supported upon stationary bearings, an actuating handle having pivotal support (27) upon said torque shaft, the axis of said support (27) being perpendicular to the axis of said shaft, a torque shaft fixed in direction and having a pivotal support (18) upon said handle, the axis of said support (18) being perpendicular to the axis of said second shaft, whereby either shaft may be rotated by said handle and whereby the weight of said second torque shaft is supported upon said first torque shaft.

5. A torque shaft (11) fixed in direction, an actuating handle pivoted upon said shaft, the pivot axis (27) being perpendicular to the shaft axis, a second torque shaft (10) fixed in direction and pivoted upon said handle, the pivot axis (18) being perpendicular to the second shaft axis, said pivot axes (27 and 18) being mutually perpendicular for all positions of said handle.

6. A torque shaft (11), an actuating handle pivoted upon said shaft, the pivot axis (27) being perpendicular to the shaft axis, a second torque shaft (10) pivoted upon said handle, the pivot axis (18) being perpendicular to the second shaft axis, said pivot axes (27 and 18) passing through a common point for all positions of said handle, and pivot means (28) permitting the angle between said torque shafts (10 and 11) to vary.

In testimony whereof I hereto affix my signature.

JOSEPH L. McCLANE.